Oct. 8, 1929.  J. W. ANDERSON  1,730,342
WINDSHIELD CLEANING MEANS
Filed May 29, 1926
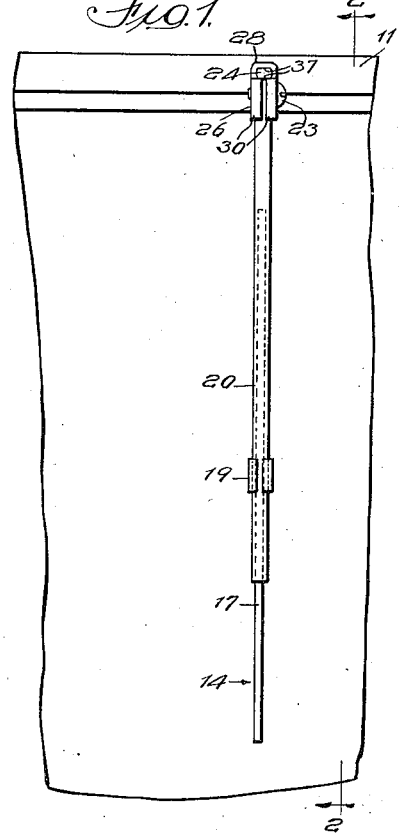
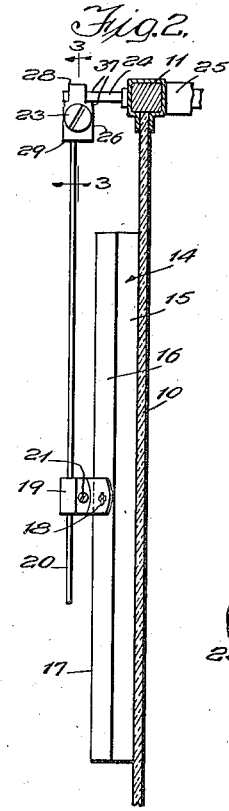
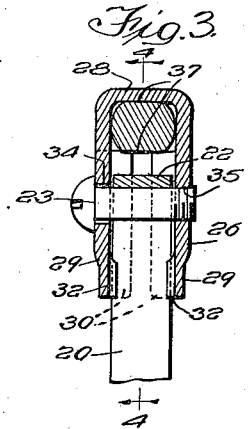
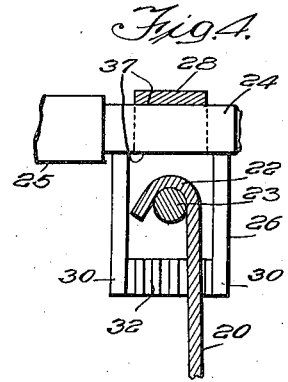
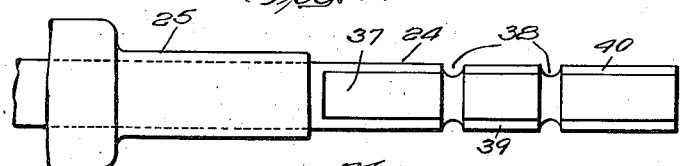
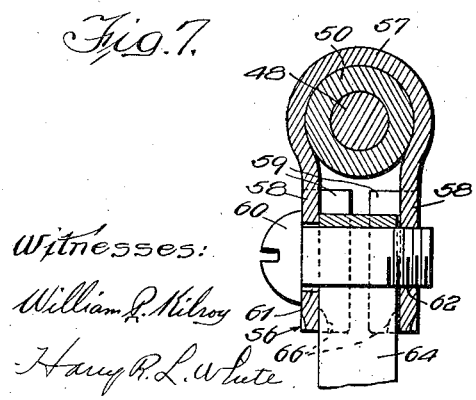
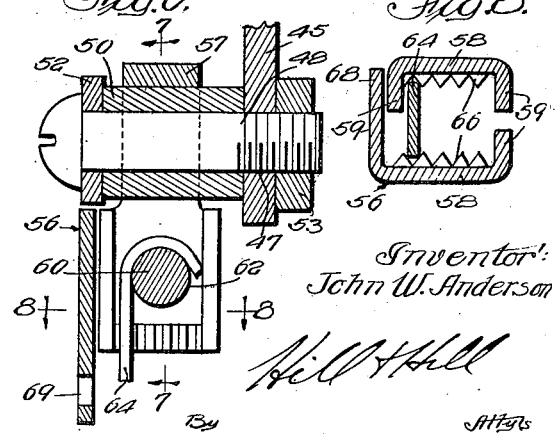
Inventor:
John W. Anderson Patented Oct. 8, 1929

1,730,342

UNITED STATES PATENT OFFICE

JOHN W. ANDERSON, OF GARY, INDIANA

WINDSHIELD-CLEANING MEANS

Application filed May 29, 1926. Serial No. 112,711.

My invention relates to windshield cleaning means and particularly to means for connecting a squeegee, or the equivalent, to means whereby it may be operated.

The invention has among its other objects the production of apparatus of the kind described which is compact, convenient, durable, efficient and satisfactory for use wherever found applicable.

A particular object of the invention is to provide apparatus of the kind described which can be quickly and easily adjusted to regulate the pressure with which the squeegee, or the equivalent, engages the windshield.

Another particular object of the invention is to provide apparatus of the kind described which can be easily and quickly adjusted to bring the squeegee into an operative position with respect to the windshield.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is an end elevation of a squeegee and apparatus for mounting the squeegee in operative position with respect to a windshield, a portion of the windshield being shown;

Fig. 2 is a section taken on line 2—2 of Fig. 1;

Fig. 3 is an enlarged section taken on line 3—3 of Fig. 2;

Fig. 4 is an enlarged section taken on line 4—4 of Fig. 3;

Fig. 5 is a detail view of one end of the shaft upon which the squeegee shown in Fig. 1 is mounted;

Fig. 6 is a central section taken through apparatus embodying another form of the invention;

Fig. 7 is a section taken on line 7—7 of Fig. 6; and

Fig. 8 is a section taken on line 8—8 of Fig. 6.

Referring for the present to Figs. 1 to 5, inclusive, of the drawings, the reference character 10 designates a windshield provided with a frame 11, the details of which do not form a part of this invention. Engaging the windshield 10 is a squeegee 14 comprising a strip 15 of resilient material, such as rubber or the equivalent, the strip 15 being mounted in any suitable holder, but preferably in a U-shaped member 17 which, in this instance, is pivoted by a cotter pin 18 to two clamping members 19. The clamping members 19 are secured by a bolt or screw 21 or the equivalent to a flat metallic strip 20 which functions as a leaf spring and is provided with a hook 22 at its upper end to engage a bolt or screw 23 or the equivalent. The screw 23 forms part of means provided for securing the strip 20 to a shaft 24 journaled in a bearing member 25 or the equivalent mounted upon the frame 11, means (not shown) being provided whereby the shaft 24 may be oscillated to oscillate the strip 20 which, in turn, will sweep the squeegee 14 across the windshield 10 to clean it.

In addition to the aforementioned screw 23, the means for securing the strip 20 to the shaft 24 comprises a U-shaped clamp member 26 comprising a cross piece and integral leg portions 29, the leg portions 29 being provided with inwardly extending integral flanges 30 which cooperate with the cross piece 28 to rigidly secure the clamp member to the shaft 24. As indicated in Figs. 3 and 4, the free ends of the leg portions 29 are preferably provided with a plurality of aligned notches, detents or teeth 32 engageable with the side edges of the strip 20. The construction is such that the strip 20 may be adjusted relative to the windshield 10 to regulate the pressure with which the squeegee engages the windshield and to permit the apparatus to be adjusted for frames of different sizes. Thus, the clamp member 26 is preferably formed from substantially resilient material which insures that the leg portions 29 will spring apart when the screw 23 is loosened in the clamp member and the teeth 32 will be disengaged from the strip 20 permitting it to be angularly adjusted around the longitudinal axis of the screw 23. After the strip 20 has been brought into the desired position, the screw 23 may be manipulated to draw the leg portions 29 toward each other so that one pair of aligned teeth 32 will engage the strip 20 and secure it in the desired position. It may be well to point out that the screw 23 passes freely through an aperture 34 formed in one of the leg portions 29 and is screw-threaded into an aperture 35 formed in the other leg portion 29.

In Fig. 5 I have illustrated that end of the shaft 24 to which the clamp member 26 is secured. As illustrated in Fig. 5 and also in Fig. 3, this end of the shaft 24 is preferably non-circular in cross section so that there will not be any accidental angular displacement of the clamp member 29 around the shaft when they are assembled, flanges 30 and the cross piece 28 being so designed that they engage flattened surfaces 37 formed upon the shaft. Obviously, when the screw 23 is tightened, the shaft is clamped between the flanges 30 and the cross piece 28. The shaft is preferably provided with a plurality of annular grooves 38 defining portions 39 and 40 which may be broken off from the remainder of the shaft with very little effort. This permits shafts 24 to be supplied in a standard size instead of a plurality of sizes for different makes of windshields. Thus, in some instances, it may be necessary to secure the clamp member 26 to the extreme end portion 40 and in other instances it may be necessary to secure the clamp member 26 to the portion 39. Obviously, when the portion 39 is employed, the portion 40 may be broken off from the remainder of the shaft to obviate the necessity of having the shank project an undesired distance in front of the windshield. It is also obvious that if the windshield construction is such that the clamp member 26 may be secured to the shaft 24 to the left (Fig. 5) of the portion 39, both of the portions 39 and 40 may be broken off from the remainder of the shaft.

When the apparatus shown in Figs. 1 to 5, inclusive, is being assembled upon a windshield, the bearing member 25 is properly assembled with the frame member 11 in any suitable manner so that the shaft 24 may project in front of the windshield. The squeegee 14, the strip 20 and the clamp member 26 may then be assembled as a unit to the shaft 24, the screw 23 being manipulated to secure the clamp member in any desired portion of the shaft. Of course, the strip 20 may be adjusted simultaneously in the manner above described to bring the squeegee 14 into effective engagement with the windshield 10. With respect to the adjustment of the strip 20 it will be noted that the flanges 30 limit angular displacement thereof around the screw 23 so that the strip cannot work free from the clamp member.

Referring to Figs. 1 and 2, it will be noted that the squeegee 14 may be longitudinally displaced along the strip 20, it being only necessary to manipulate the screw 21 and to slide the clamp members 19 into the desired position when such an adjustment is to be made.

Referring now to Figs. 6 to 8, inclusive, I have shown another form of the invention embodied in apparatus which is preferably used when a plurality of squeegees are employed to clean a windshield. Apparatus of this character is more fully shown and described in my copending application, Serial No. 156,931, filed December 24, 1926, wherein windshield cleaning apparatus resembling that illustrated in Figs. 1 to 5 of this application is operatively connected to apparatus comprising a second squeegee. The means for mounting the second squeegee upon the windshield frame is substantially identical with the apparatus shown in Figs. 6 to 8 of this application. Thus, at 45 in Fig. 6 I have shown a portion of a bracket which is adapted to be secured to the windshield frame and is provided with an aperture 47 through which the shank of a bolt or screw 48 is passed. Mounted upon the screw 48 and positioned within the bracket 45 and the head of the screw is a sleeve 50. Disposed intermediate the head of the screw and the sleeve is a washer 52 which is preferably of larger diameter than the sleeve 50 for a purpose which will presently appear. A nut 53 screw-threaded upon the screw 48 may be manipulated to secure the sleeve 50 and the washer 52 to the bracket 45. Mounted upon the sleeve 50 is a clamp member 56 which has substantially the same function as the aforementioned clamp member 26, the clamp member 56 being substantially U-shaped. In this instance, the clamp member 56 is formed with an arcuate portion 57 adapted to partially encircle the sleeve 50. Formed integral with the arcuate portion 57 are leg portions 58 having inwardly extending flanges 59 which resemble the aforementioned flanges 30. A screw 60 passing through an aperture 61 formed in one of the leg portions 58 is screw-threaded into an aperture 62 formed in the other leg portion 58 and may be manipulated to draw the leg portions toward each other. It is readily understood that if the screw 60 is loosened the leg portions 58 will spring apart sufficiently so that the bracket 64 substantially identical with the aforementioned strip 20 may be angularly adjusted around the screw 60. The strip 64 is engageable by a plurality of aligned notches, detents or teeth 66 formed in the free ends of the leg portions 58, these teeth having substantially the same function as the aforementioned teeth 32 shown in Figs. 3 and 4. As best shown in Figs. 6 and 8, one of the flanges 59 is of greater width than the remaining flanges 59 and is further identified by the reference character 68. The flange 68 extends beyond the free ends of the leg portions 58 and is provided with an aperture 69 so that it may be connected by a link (not shown) to the strip 20 shown in Figs. 1 to 4, inclusive. The manner in which the flange 68 is connected to the strip 20 is more clearly illustrated and described in the aforementioned copending application.

The construction of the apparatus shown in Figs. 6 to 8, inclusive, is such that the clamp member 56 is journaled upon the sleeve 50 and the sleeve 50, in turn, is journaled upon the screw 48, but it is obvious that the sleeve 50 may be made to turn with the clamp member 56, if it is so desired, or that the sleeve 50 may be non-rotatably mounted upon the screw 48, if it is so desired. The apparatus shown in Figs. 6 to 8, inclusive, is assembled with the windshield in substantially the same manner as that shown in Figs. 1 to 5, inclusive.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In apparatus of the kind described, a wiper arm comprising a squeegee having a metallic strip secured thereto for attachment to the wiper actuating means and an adjustable clamp member adapted to connect the wiper arm to the actuating means, said clamp having a plurality of teeth engageable with the strip whereby the strip may be secured in a plurality of adjusted positions.

2. In apparatus of the kind described, a squeegee, a resilient metallic strip, means for securing the squeegee to the strip, and a clamp member having a plurality of teeth engageable with the strip whereby the strip may be secured in a plurality of adjusted positions.

3. In apparatus of the kind described, a wiper arm comprising a squeegee having a metallic strip secured thereto for attachment to the wiper-actuating means and a substantially U-shaped adjustable clamp member adapted to connect the wiper arms to the actuating means, said clamp having a plurality of teeth engageable with the strip whereby the strip may be secured in a plurality of adjusted positions.

4. In windshield cleaning apparatus, a drive member mounted upon the windshield, a squeegee engageable with the windshield, a metallic strip secured to the squeegee and means connecting the metallic strip to the drive member comprising a clamp carried by the drive member and having a plurality of detents therein, engageable by said strip to secure it in adjusted positions, and means for compressing the clamp to effectively engage the drive member and to effectively engage said strip with said detents.

5. In windshield cleaning apparatus, actuating means mounted upon the windshield, a squeegee engageable with the windshield, and means for connecting the squeegee to the first-mentioned means comprising a clamp having a plurality of detents therein, a resilient metallic strip engageable by said detents to secure it in adjusted positions, means for securing the squeegee to the strip, and a screw for compressing the clamp to effectively engage the first-mentioned means and to effectively engage said strip with said detents.

6. In windshield cleaning apparatus, a sleeve, means for mounting the sleeve on the windshield, a clamp member carried by the sleeve and provided with a plurality of detents, a relatively long member engageable by said detents, means for compressing said clamp whereby said detents secure said long member in an adjusted position, and a squeegee carried by said long member.

7. In windshield cleaning apparatus, a shaft, a resilient member, means comprising detents securing the resilient member directly to the shaft whereby it may be angularly adjusted around a pivotal axis normal to the longitudinal axis of the shaft, a squeegee, and means for securing the squeegee to the resilient member so as to permit angular adjustment thereof.

8. In apparatus of the kind described, a squeegee, a shaft, and means for connecting the squeegee to the shaft comprising a member clamped upon the shaft and having a plurality of guides, a flexible metallic strip adjustably secured to said member and coacting with said guides, and means securing the squeegee to the strip.

9. In apparatus of the kind described, a squeegee, a shaft, and means for connecting the squeegee to the shaft comprising a member clamped upon the shaft and having a plurality of guides, means adjustably secured to said member and coacting with said guides, and means adjustably securing the squeegee to said last-mentioned means.

10. In a windshield cleaning device and in combination, a shaft, an arm adjacent thereto, a clamp adjustably connecting said shaft and said arm comprising a substantially U-shaped member, the inner surfaces at the open end of the U each provided with a plurality of detents, said detents holding said arm in adjusted position when the clamp engages said arm.

11. In a windshield cleaning device and in combination, an arm having one end bent over, a clamp adjustably securing said arm comprising a substantially U-shaped member, aligned apertures in the legs of the U, means extending through said apertures for compressing the clamp, said means and said bent over portion of said arm forming a pivot for said arm, and detents on the inner sides of the clamp for holding the arm in adjusted position.

12. In a windshield cleaning device and in combination, a shaft, an arm adjacent to said shaft, a clamp adjustably connecting said arm to said shaft, comprising a member bent substantially U-shaped and engaging said shaft in the closed end of said U, the inner sides of the open end of the U provided with a plurality of detents for holding said arm in adjusted position, the longitudinal edges of the legs of the U bent inward toward the longitudinal center line and engaging said arm.

13. In apparatus of the class described, a squeegee and means mounting the same comprising a clamp member having a plurality of guides, and a member carrying said squeegee and capable of coacting with said clamp member for adjusting said squeegee at a number of predetermined points so as to regulate the pressure with which it engages a surface to be wiped.

14. In windshield cleaning apparatus, a shaft, a resilient member, means including a clamp having detents thereon securing the resilient member to the shaft whereby it may be angularly adjusted to predetermined positions around a pivotal axis normal to the longitudinal axis of the shaft, and a squeegee carried by the resilient member.

In testimony whereof, I have hereunto signed my name.

JOHN W. ANDERSON.